J. H. NASON.
Coffee Percolator.
No. 51,741. Patented Dec. 26, 1865.
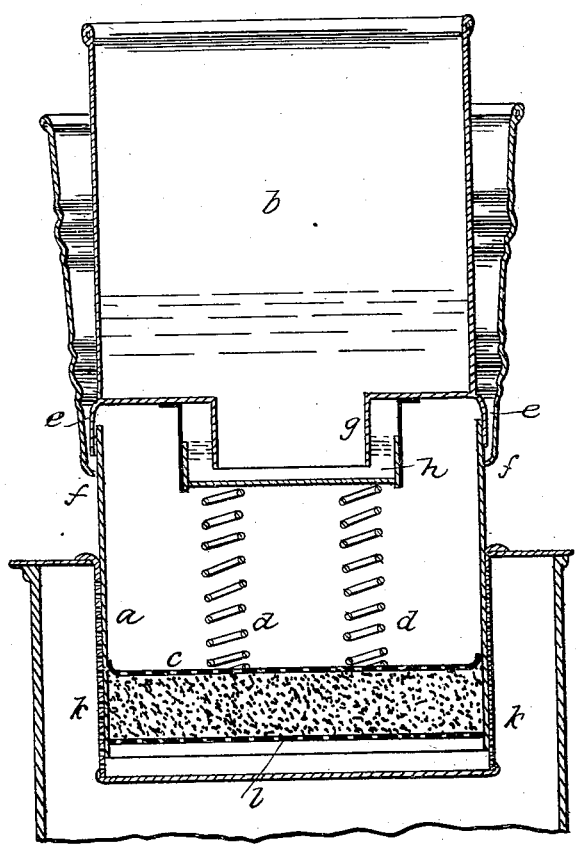

UNITED STATES PATENT OFFICE.

JAMES H. NASON, OF FRANKLIN, MASSACHUSETTS.

COFFEE-PERCOLATOR.

Specification forming part of Letters Patent No. 51,741, dated December 26, 1865.

*To all whom it may concern:*

Be it known that I, JAMES H. NASON, of Franklin, in the county of Norfolk and State of Massachusetts, have invented an Improved Coffee-Percolator; and I do hereby declare that the following, taken in connection with the drawing which accompanies and forms part of this specification, is a description of my invention sufficient to enable those skilled in the art to practice it.

The invention relates to the construction of apparatus for preparing the extract or infusion from coffee, or, as it is generally termed, for "making coffee." Various percolators or filters of more or less practicability are in common use for obtaining clear beverages from coffee without the use of fining substances; but all of them, so far as I know, are defective in construction, in that they permit the escape of the aroma from the coffee during or subsequent to the process of preparation.

My filter or percolator is designed to obviate this defect by interposing between the coffee-chamber and the vessel through which the water passes to this chamber fluid-joints, which shall prevent all escape of the volatile principle from the coffee when the apparatus is in use, and it is in this construction that my invention consists.

A percolator or filter embodying my invention is shown in central vertical section in the drawing.

$a$ denotes the ground-coffee receptacle or chamber; $b$, the water-vessel placed therein; $c$, a perforated disk held lightly to the surface of the mass of coffee by springs $d$, and yielding to the expansion of the coffee as it becomes saturated. The bottom surface of the vessel $b$ has a projecting ring or flange, $e$, which fits or extends into a water-channel, $f$, made around the chamber $a$. A short outlet-pipe, $g$, projects from the center of the chamber $b$ down into a shallow cup, $h$, hung from the box $a$.

The ground coffee being placed on the perforated diaphragm $i$, a little water is poured into the chamber $a$ outside of the chamber $b$ to fill the channel $f$. Water being then poured into the vessel $b$, it flows through the pipe $g$ into and over the cup $h$, and thence percolates through the ground coffee, and it will be obvious that the volatile products of the decoction are prevented from escaping upward by the fluid joints at $f$ and $h$, the cup $h$ remaining filled after the water has all passed through the vessel $b$. The receptacle $a$ sets into a cylindrical vessel, $k$, having perforated sides, the vessel $a$ fitting tightly into the cylinder $k$, so that it will remain at whatever distance it is pushed down into the vessel $k$.

By this construction it will readily be seen that the amount of perforated surface in the cylinder through which the fluid infusion escapes into the urn or coffee-pot upon which the cylinder $k$ rests may be regulated at pleasure, and that by this adjustment the hot water may be kept a greater or less time in contact with the ground coffee, according to the strength required in the infusion or beverage, or the amount of ground coffee through which the water passes.

I claim—

The construction of the coffee and water vessels $a\ b$ with fluid joints, in the manner and for the purpose substantially as set forth.

In witness whereof I have hereunto set my hand this 30th day of August, A. D. 1865.

JAMES H. NASON.

Witnesses:
   J. B. CROSBY,
   F. GOULD.